(12) United States Patent
Porcari et al.

(10) Patent No.: US 9,053,447 B2
(45) Date of Patent: Jun. 9, 2015

(54) METHOD AND SYSTEM FOR AUTOMATED MESSAGING IN AN ONLINE LEGAL WORKFLOW TOOL

(71) Applicant: FORD GLOBAL TECHNOLOGIES, LLC, Dearborn, MI (US)

(72) Inventors: Damian O. Porcari, Farmington Hills, MI (US); David Dinsdale, Bounds Green (GB)

(73) Assignee: Anaqua, Inc., Boston, MA (US)

( * ) Notice: Subject to any disclaimer, the term of this patent is extended or adjusted under 35 U.S.C. 154(b) by 135 days.

(21) Appl. No.: 13/728,182

(22) Filed: Dec. 27, 2012

(65) Prior Publication Data

US 2013/0117065 A1 May 9, 2013

Related U.S. Application Data

(63) Continuation of application No. 10/441,924, filed on May 20, 2003, now abandoned.

(51) Int. Cl.
| | |
|---|---|
| *G06F 15/16* | (2006.01) |
| *G06Q 10/06* | (2012.01) |
| *G06Q 10/10* | (2012.01) |
| *G06Q 50/18* | (2012.01) |
| *H04L 12/58* | (2006.01) |

(52) U.S. Cl.
CPC ............ *G06Q 10/0633* (2013.01); *G06Q 10/06* (2013.01); *G06Q 10/10* (2013.01); *G06Q 50/18* (2013.01); *H04L 12/585* (2013.01); *H04L 51/12* (2013.01)

(58) Field of Classification Search
None
See application file for complete search history.

(56) References Cited

U.S. PATENT DOCUMENTS

| | | | | |
|---|---|---|---|---|
| 5,528,757 | A * | 6/1996 | Yamasaki | 709/201 |
| 6,496,853 | B1 * | 12/2002 | Klein | 709/206 |
| 6,640,238 | B1 * | 10/2003 | Bowman-Amuah | 709/201 |
| 7,065,493 | B1 * | 6/2006 | Homsi | 705/7.26 |

* cited by examiner

*Primary Examiner* — Ranodhi Serrao
(74) *Attorney, Agent, or Firm* — Brooks Kushman P.C.

(57) ABSTRACT

A computer system and computer-implemented method for message or "chaser" management in a distributed legal workflow environment is provided. Embodiments provide central administration of legal workflow conducted by a plurality of distributed participants. A plurality of workflow chasers associated with a plurality of workflow records are created and defined based on a plurality of attributes (e.g. associated record identification, action identification, target user, display date, etc.). New and existing chasers are compared to one another to identify any redundancies (e.g. duplicate chasers, unnecessary chasers, etc.). Redundant chasers are deleted or otherwise de-activated. Remaining chasers are implemented within the distributed legal workflow environment, as appropriate (i.e. displayed to their target user on the associated target display date. Chasers may be created automatically as required for conformance to workflow policies, procedures or applicable laws. Chasers may also be user-defined and modified.

17 Claims, 6 Drawing Sheets

Chaser List for Record 123123123

| ICON | Edit | Awaiting Renewal Certificate<br>John Brown<br>Automatically generated by LawEngine | | 12 Dec 2001<br>No more escalation possible |
|---|---|---|---|---|
| ICON | Edit | Renewal Due<br>James Smith<br>Automatically generated by LawEngine | Display<br>Will Escalate | 2 December 2011<br>2 February 2012 |
| ICON | Edit | URGENT - Custom<br>James Smith<br>Remember to reevaluate registration once expected 2021 law changes come into effect | | 1 March 2020 |

Show closed chasers ☐ — 104    (Bulk Modify Chasers) —112    (Add Custom Chasers) —110

/LawEngine/ChaserHistory.asp    (Close)

Bulk Modify Chasers for Record 123123123

This page allows you to change the target user of multiple chasers.
Select a new target user for the chasers and select each chaser to change New Target User: [__________] — 124

126 {
  ☐ Awaiting Renewal Certificate
      John Brown
  ☐ Renewal Due                    Display      2 December 2011
      James Smith                  Will Escalate 2 February 2012
  ☐ URGENT - Custom                             1 March 2020
      James Smith
}

/LawEngine/BulkModifyChaser.asp    (Cancel)    (Close)

*Fig. 10*

Modify Chaser

Chaser Id: <Chaser ID>  Name: <Chaser Name>

Chaser created on <CreatedDate> by <CreateUsername>
Chaser generated by law <lawName>, and is based on template <template id>.
Current targets: <primary target user>, <other targets> —— 116

Urgent: ☐ Tick box to mark this chaser as urgent

Primary Target User:

Description: <Description>

This core action date of a chaser is used as a basis for its display and chaser dates. Modifying this date will influence both of these dates.

Core Action Date: <ActionDate> (Date)

Display Date: <Display/Date> (Postpone)

Escalation Date: <NextEscalationDate> (Date) —— 120

(Cancel)  (Close Chaser)  (Save) —— 122

ICON

114

118

/LawEngine/ModifyChaser.asp

METHOD AND SYSTEM FOR AUTOMATED MESSAGING IN AN ONLINE LEGAL WORKFLOW TOOL

CROSS-REFERENCE TO RELATED APPLICATION

This application is a continuation of application Ser. No. 10/441,924, filed May 20, 2003, the contents of which are hereby incorporated by reference herein.

BACKGROUND OF THE INVENTION

1. Field of the Invention

This invention relates generally to online workflow software and management, and more particularly to a method and system for automated messaging in an online legal workflow tool.

2. Background Art

In today's legal arena, corporations, institutions and firm clients typically rely on multiple distributed firms and agencies to assist with or independently conduct their legal workflow. It is not uncommon for a single corporation to have several private law firms handling hundreds of co-pending legal matters ranging from basic transactional work to larger projects such as litigation, negotiation, etc. In the intellectual property area, for example, a corporation often relies on outside counsel to independently manage all searches and applications for trademarks, patents etc.

A variety of companies currently offer software applications for managing or otherwise automating workflow and associated knowledge in both the legal and non-legal arenas. One example is Aspen Grove's ipWorkflow. Aspen Grove is located at 101 Federal Street, Suite 1900, Boston, Mass. 02110 (www.aspengrove.net). Another example is offered by Vinsoft Solutions located at 1155 West Chestnut Street, Suite 2-C, Union, N.J. 07083 (www.vinsoftsolutions.com). Another example is offered by FoundationIP located at 830 TCF Tower, 121 South 8th Street, Minneapolis, Minn. 55402 (www.foundationip.com). Another example is Inproma offered by Computer Patent Annuities North America LLC located at 225 Reinekers Lane, Suite 400, Alexandria, Va. 22314 (www.cpajersey.com). Another example is offered by iManage located at 950 Tower Lane, Suite 500, Foster City, Calif. 94404 (www.imanage.com).

Embodiments and features of the present invention include an alternative to or valuable improvement upon conventional legal workflow applications. Without limiting the scope or applicability of the present invention, one goal of the present invention is to more-effectively reduce or eliminate unnecessary automated workflow messages. Conventional workflow applications often provide functionality for creating automated e-mail reminders or messages to workflow participants indicating that certain tasks or deadlines have come due. For certain types of workflow, however, a variety of inter-dependent tasks or deadlines may apply to a single workflow record or event.

By way of example in the intellectual property (patent) arena, the receipt of a patent examiner's office action on a pending US utility patent application may trigger the creation of four inter-related reminders—one reminder for the three-month deadline to respond to the office action, and three reminders thereafter for the available one, two and three-month extensions of time to respond. Notably, all of the created reminders are inter-related to the requisite task at issue (i.e. responding to the office action). Responding to the office action prior to the three-month deadline eliminates any need to seek the one, two or three-month extensions of time. Accordingly, any existing reminders associated with these dependent events become unnecessary when the requisite task or event at issue occurs.

A failure to eliminate or otherwise de-activate such dependent reminders, however, typically results in unnecessary user frustration. With the prevalence of e-mail spam and the ever-increasing integration of workflow management applications, user e-mail account management has already become somewhat time-consuming for most computer users. Receiving invalid workflow reminders only acts to compound this frustration. Further, the existence of such invalid reminders challenges user trust in and reliance upon valuable workflow management applications.

What is needed is a method and system for electronic workflow messaging that effectively reduces or otherwise eliminates/de-activates unnecessary workflow reminders.

SUMMARY OF THE INVENTION

Without limitation, a preferred embodiment of the present invention includes a computer system for chaser management in a distributed legal workflow environment. The computer system provides central administration of legal workflow conducted by a plurality of distributed participants and comprises a computer network including one or more computers operably programmed and configured to generate a plurality of workflow chasers associated with a plurality of workflow records. Chasers are defined by a plurality of attributes including an associated record identification, an action identification, a target user and a display date. Other attributes include an escalation date, an escalation manager, and an escalation offset. Many other chaser attributes are described herein.

New and existing chasers are compared to one another, based on their attributes, to identify any redundancies (e.g. duplicate chasers, unnecessary chasers, etc.). Redundant chasers are deleted or otherwise de-activated. Remaining chasers are implemented within the distributed legal workflow environment, as appropriate (i.e. displayed to their target user on the associated target display date.

Chasers may be created automatically as required for conformance to workflow policies, procedures or applicable laws. Chasers may also be user-defined and modified. Bulk chaser modification enables a user to modify a plurality of different chasers in a single modification transaction.

In an alternate embodiment of the present invention, a computer-implemented method for chaser management in a distributed legal workflow environment is provided. A preferred methodology includes generating a plurality of workflow chasers associated with a plurality of workflow records, each chaser including at least a record, action, target user and display date attribute; comparing attributes of the plurality of workflow chasers to identify at least one redundant chaser; removing the at least one redundant chaser; and implementing the remaining chasers in the distributed legal workflow environment.

The above objects and other objects, features, and advantages of the present invention are readily apparent from the following detailed description of the preferred embodiments when taken in connection with the accompanying drawings and claims.

DETAILED DESCRIPTION OF THE PREFERRED EMBODIMENT(S)

System Overview

Embodiments of the present invention relate to an online legal workflow collaboration tool and methodology. In today's legal arena, corporations, institutions and firm clients typically rely on multiple distributed firms and agencies to assist with or independently conduct their legal workflow. It is not uncommon for a single corporation to have several private law firms handling hundreds of co-pending legal matters ranging from basic transactional work to larger projects such as litigation, negotiation, etc. In the intellectual property area, for example, a corporation often relies on outside counsel to independently manage all searches and applications for trademarks, patents etc.

Advantages of such an online legal workflow collaboration tool and methodology include a reduction in the time, cost and risk associated with conventional distributed/remote management of legal workflow. Via the online collaboration tool, integrated parties cooperate with real-time knowledge access and visibility to work product and status. A law engine implements or otherwise applies business/legal logic to this integrated pool of knowledge to produce a value-added workflow.

Figure 1:
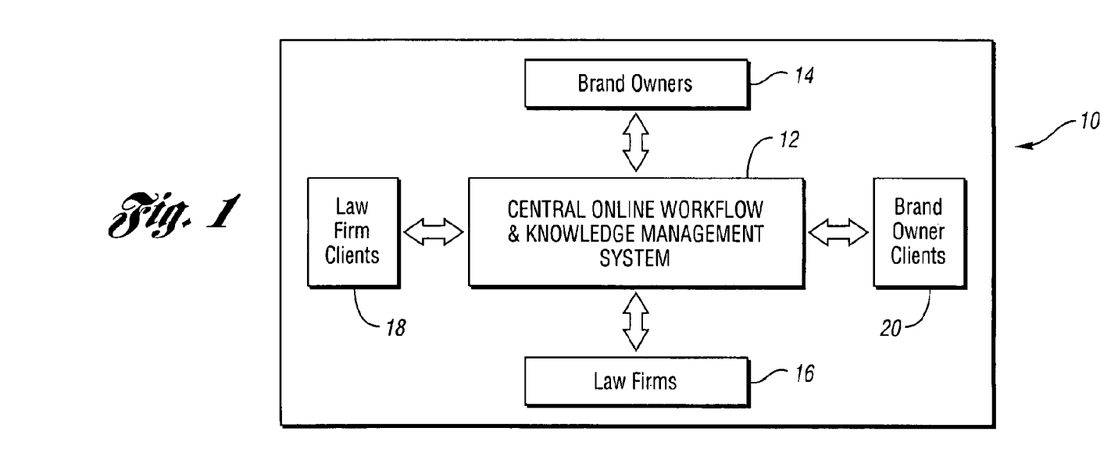
FIGS. 1 and 2 illustrate an overview of an online legal workflow and knowledge management collaboration system in accordance with one embodiment or aspect of the present invention.
Figure 2:
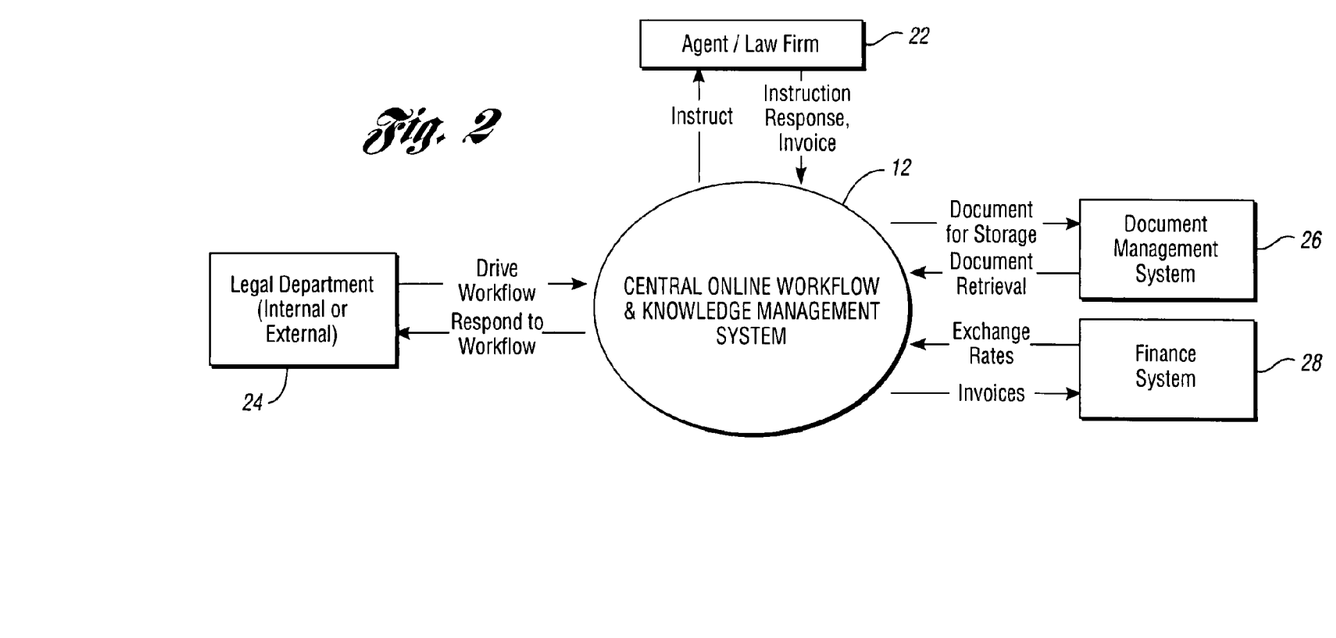

FIG. 1 illustrates an overview of environment 10 in which embodiments of the present invention may operate. A central online legal workflow and knowledge management system 12 operably interfaces or is otherwise in operable communication with a plurality of local or distributed workflow participants (e.g., brand owners 14, agents/law firms 16, law firm clients 18, brand owner clients 20, etc.). More specifically, and as illustrated in greater detail in FIG. 2, workflow participants (e.g. agent/law firm 22, legal department 24, etc.) and associated workflow applications (e.g. document management system 26, finance system 28, etc.) productively collaborate with one another via a central online legal workflow and knowledge management system 12. Notably, an unlimited number of participants may collaborate with one another in an unlimited number of different fashions.

As evidenced by the variety and breadth of computer architectures hosting or otherwise supporting existing knowledge and management workflow applications, those of ordinary skill in the art recognize that such applications may be implemented on or over a multitude of different computing platforms and networks. According to one embodiment, functional aspects of the present invention may be centrally hosted from one or more web servers to web browsers located at a plurality of local or distributed workflow participant locations. Alternately, aspects of the present invention may be implemented according to a more dedicated/localized client-server architecture over a local or wide area network.

Overview of Automated Messaging

One aspect of the present invention includes an alternative to or improvement upon automated workflow messaging associated with existing legal workflow and knowledge management systems. According to one embodiment of the present invention, automated messages or "chasers" may be custom-created (e.g. user-defined) or automatically-created (e.g. law engine defined). For example, an automatically-created chaser may be generated by a computer-implemented law engine to automatically remind legal workflow participants of legal workflow tasks to be performed and corresponding deadlines.

According to one aspect of the present invention, chasers may be linked to individual workflow records or record groups associated with legal workflow.

According to another aspect of the present invention, chasers may be configured to behave in different manners depending on the action or event they refer to. In one example, "normal" and "deadline" chasers are provided. A normal chaser may refer, for example, to a date that an action or task should be completed by. In contrast, a deadline chaser may refer to a date that an action or task must be completed by.

Chasers may be configured to maintain or calculate a variety of different information including, but not limited to: an action or event type identification (e.g. application filing chaser), the record the chaser refers to, users who will see the chaser, dates/times when the chaser should be seen, the chaser type (e.g. normal or deadline), the deadline/action date for the chaser, an escalation manager for the chaser, a current escalation level, a next escalation date/time, a description of the task/event the chaser refers to, a description of any other information about the chaser, the identification of the user or law that created the chaser, the date the chaser was created, an indication as to whether the chaser has been closed, a date and reason for closing the chaser (if closed), a severity level for the chaser, and a creating law for a chaser to detect the impact on those changed chasers by a change in law. Notably, those of ordinary skill in the art will recognize that any portion of such information, or additional and different information altogether, may be associated with a chaser.

If a chaser relates to a legal record (e.g. intellectual property record), the user who sees the chaser will usually include the owner of the legal record or the agent allocated to the record. Preferably, the law engine provides the chaser with this information. Notably, if a record owner, agent or escalation manager changes, any open chasers may be updated accordingly. Chaser updates or changes preferably include a user-defined or automatically defined reason for the update or change. Similarly, when a chaser is closed, a reason for the closure is preferably indicated—either in a manual or automatic fashion.

Preferably, chasers include a severity indication. Severity indications may be defined in an automated fashion (e.g. based on relationship between task/action to be performed and current date), or in a manual user-defined fashion. Chaser severity may additional depend on the type of chaser and its escalation status. In one embodiment, a graphical icon indicates the severity and source of a chaser (e.g. auto-chaser, normal, gray bomb, red bomb, etc.).

According to another aspect of the present invention, chasers may be linked in an automated fashion to user calendar software (e.g. Microsoft Outlook) such that when a chaser is created either by a law engine or manually, a notification, diary entry, etc. automatically populates on affected user's respective calendar software applications.

A chaser is an automated reminder of legal workflow actions to be completed. Chasers may be linked to workflow records and automatically presented to appropriate workflow participants as dictated by a legal workflow law engine. Chasers may also be user-defined on an ad-hoc basis.

During creation, chasers may retrieve or receive necessary timing information from the law record, and any necessary date information from an underlying data or document record. User-generated chasers may receive timing information from the creating user. Some chaser information may depend on the type of chaser, rather than particular law. For example, an initial target user may be set based on the type of chaser and the record type.

Chasers may be sent to a record owner or a record agent's default user for the record type. In another example, the initial target may to be the record owner's escalation manager, or a record-type manager for the record owner's company.

A law engine may create chasers that appear in the past—such as when historical record information has been added. In one embodiment, the system automatically postpones such chasers until the day of creation. Preferably, escalation information remains the same. As escalation is typically a scheduled operation, chasers will not be escalated until the operation is complete.

Chasers can be completed (closed) by a law engine or by a user. If a user tries to close a law-generated chaser, they may be presented with a warning message and required to confirm the closure. In one implementation, manually closing a law engine-generated chaser will not add any event history entry, or any other action which would have been taken had the law engine closed the chaser. Users may close user-generate chasers.

When a law engine-generated chaser is automatically closed, no entry in the event history need take place. Event history may be added by the law engine when the law engine closes the chaser.

Preferably, a closing comment (e.g. closed due to cancellation, closed due to completion, etc.) will be added to closed chasers. In one embodiment, the law engine defines the closing comment for chasers that the law engine closes.

Chasers can be deleted, rather than closed. This action will remove the chaser from the system completely. Users can delete any chaser—but will be given a warning and confirmation message for their action. This will allow a user to rebuild a record if, for example, the wrong law is defined.

According to another aspect of the present invention, chasers may be modified in a variety of different fashions. Modifiable information associated with the chasers may include the severity of the chaser, the display date, the user too whom the chaser applies, the escalation manager, the escalation date, a description of any other information about the chaser, and the deadline/action date for the chaser. In addition to modifying individual chasers, a plurality of chasers may be selected for modification in a bulk fashion.

Preferably, a reason for a chaser modification is entered. A history of past chaser modifications may be maintained. In addition, rules governing chaser modifications may only enable certain users or user types to modify chasers in particular fashions. In other words, not all users may be provided functionality for all possible chaser modifications.

If the escalation manager of a record is changed, the old manager may be e-mailed (unless, of course, they were the one changing the record or their user account is disabled).

Typically, chaser target users include an agent, owning company and case manager for a particular record. Chasers may also be linked to other chasers.

Table 1 includes example role-based or participant-based rules for chaser modification. Chaser rules are typically dictated by the expected use of the legal workflow system. According to one embodiment, roles/participants include customer users, customer client users and counsel users. Other rules, roles or participants may be defined and implemented.

TABLE 1

| Modifying User | Chaser primary user is | | |
| --- | --- | --- | --- |
| | ECU | CCU | CU |
| Customer User(CU) | Can move to any user who can see the record - warn if not ECU of record agent company | Can move to any user who can see the record - warn if not CCU of record owning company | Can move to any user who can see the record- warn if not CU |
| Customer Client User(CCU) | Cannot move | Can move to any user of their company | Cannot move |
| External Counsel User(ECU) | Can move to any user of their company | Cannot move | Cannot move |

Chasers may be displayed in a variety of different fashions including a user's diary, a record's diary, a user's e-mail account or within a user's personal calendar application. A chaser displayed in a diary may be shown in association with the display date of the chaser. Only when a chaser's escalation date is reached is it typically displayed to an escalation manager.

Preferably, users can postpone chasers so that they reappear at a later time. Whenever a chaser is postponed, the postponing user should enter a reason for the postponement. The user can choose the date at which the chaser will reappear. Otherwise, the reappearance date may be defaulted to an automatic postponement interval. Postponing modifies the display offset (initially six months) for the chaser. In one implementation, the offset should not allow a date after the deadline. Alternately, if a user tries to postpone to a time either after the next escalation date or the deadline, the user may be warned and asked for confirmation. Chasers may also be postponed/escalated in an automatic fashion, as governed by a law engine.

Chaser priority/severity may be escalated in a manual or automatic fashion. Users having permission to escalate chasers, and escalation procedures for different types of chasers may be pre-defined. Typically, chasers are escalated if they remain open beyond a pre-defined date. In one implementation, escalation causes the chaser to appear in another user's diary (i.e. escalation manager). Preferably, escalation is implemented as a scheduled process.

Escalated dates may be based on an offset from the chaser's deadline for deadline chasers, and an offset from the action date for normal chasers. The offset may provide a date after the initial display date. The provided date may be before or after the deadline. When escalated, a chaser's display date may be modified so that the chaser will reappear for the users involved, even if the chaser has been postponed past the display or deadline date.

User preferences may be defined such that escalated chasers are automatically e-mailed to users associated with the chaser. Chasers may be escalated more than once. Each escalation may add another user to the list of targets for the chasers. When escalated, the next escalation date should be calculated. If no more escalation is possible, the escalation date may be set to null. Preferably, an escalation level is associated with a chaser to keep track of its escalation status.

Escalation targets may include a variety of participants including but not limited to a record owner, the escalation manager of the record owner, the escalation manager of the previous escalation target, or a record type manager set for a customer company.

Once a chaser has been escalated, any user modifications to the chaser may be reported to all chaser targets. In one implementation, escalated chasers cannot be postponed, but will have their display date recalculated if their action date is modified. The modification of the deadline date of an un-escalated deadline chaser may be reported to the first escalation manager.

To enhance the speed of escalation detection, the escalation date of a chaser may be stored or easily derived from the core chaser record.

In accordance with a preferred embodiment of the present invention, a computer system for providing and supporting chaser functionality implements a variety of related processes or work-flows including determining chaser actions, collating chaser actions, implementing chaser actions, chaser escalation and user management of chasers. These and other aspects of the present invention may be implemented using a rule-based or law-based engine enforcing business/legal policies and procedures in an automated online fashion. Those of ordinary skill in the art of workflow management applications are familiar with automated drivers for implementing or otherwise hosting a given set of workflow functionality. Notably, implementations of the present invention are not limited to the particular processes, or content thereof, as illustrated and described herein.

Process 1—Determine Chaser Actions

Figure 3:
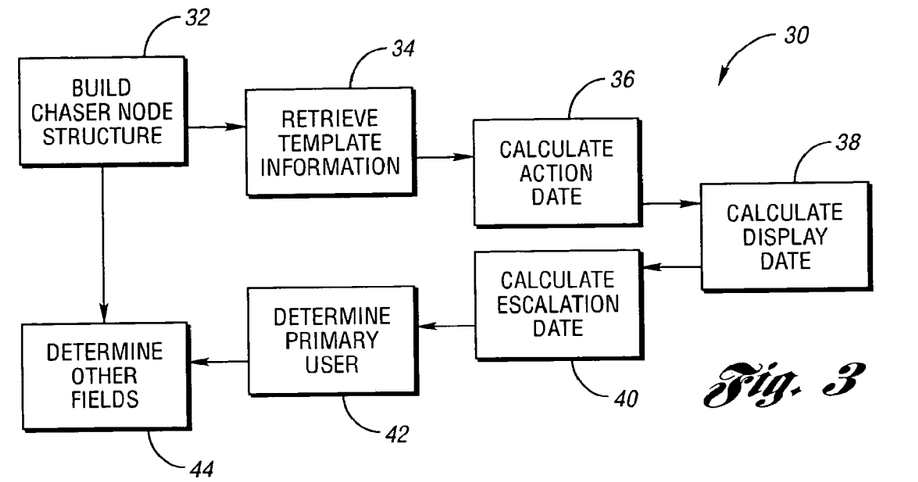
FIG. 3 is a block flow diagram illustrating a preferred methodology 30 for implementing the "Determine Chaser Action" process in accordance with one embodiment or aspect or embodiment of the present invention.

FIG. 3 is a block flow diagram illustrating a preferred methodology 30 for implementing the "Determine Chaser Action" process in accordance with one aspect or embodiment of the present invention. In this process, a plurality of workflow chasers are created or otherwise generated in association with a plurality of workflow records. Notably, the steps, content or arrangement of FIG. 3 may be modified or adapted to best-fit a particular implementation of the present invention.

Block 32 represents the "Build Chaser Node Structure" step of the "Determine Chaser Action" process. Inputs to the chaser action process may include a record structure and information for a record from an action table. Action information may include Action Name, Law Id, Chaser Template Id, Chaser Method, Chaser Description, Chaser Display Offset and Chaser Escalation Offset. The build chaser node structure step produces a holding structure for describing a chaser. XML Examples 1 and 2 describe sample chaser templates.

Example 1

```
<Chaser TemplateId="" LawId="">
    <Method></Method>
    <ActionDate></ActionDate>
    <DisplayDate></DisplayDate>
    <PostponeInterval></PostponeInterval>
    <Description></Description>
    <EscalationDate></EscalationDate>
    <User Id=""></User>
</Chaser>
```

Example 2

```
<Chaser TemplateId="1" LawId="101">
    <Method>Open</Method>
    <Name>Application Instructed</Name>
    <Description>Description of the chaser</Description>
    <ActionDate>25/03/2002</ActionDate>
    <DisplayDate Moved="0">25/03/2002</DisplayDate>#
    <EscalationDate Warn="0">26/05/2003</EscalationDate>
    <PostponeInterval>10</PostponeInterval>
    <Target Procedure="ChaserTargetCaseMgr">Case Manager</Target>
</Chaser>
```

Preferably, if there is no escalation information, an escalation node will not generally be produced. Similarly, if the method is "Close", only the Method and Name nodes will generally be produced. In accordance with Example 2, the moved attribute on DisplayDate is 1 if the date was in the past and has been moved forward. The warn attribute on EscalationDate is 1 if the date is today or in the past—this allows quick testing by the law report page.

If the method for the chaser is "close", the process may jump to the "Determine other Fields" step represented as block 44.

Figure 11:
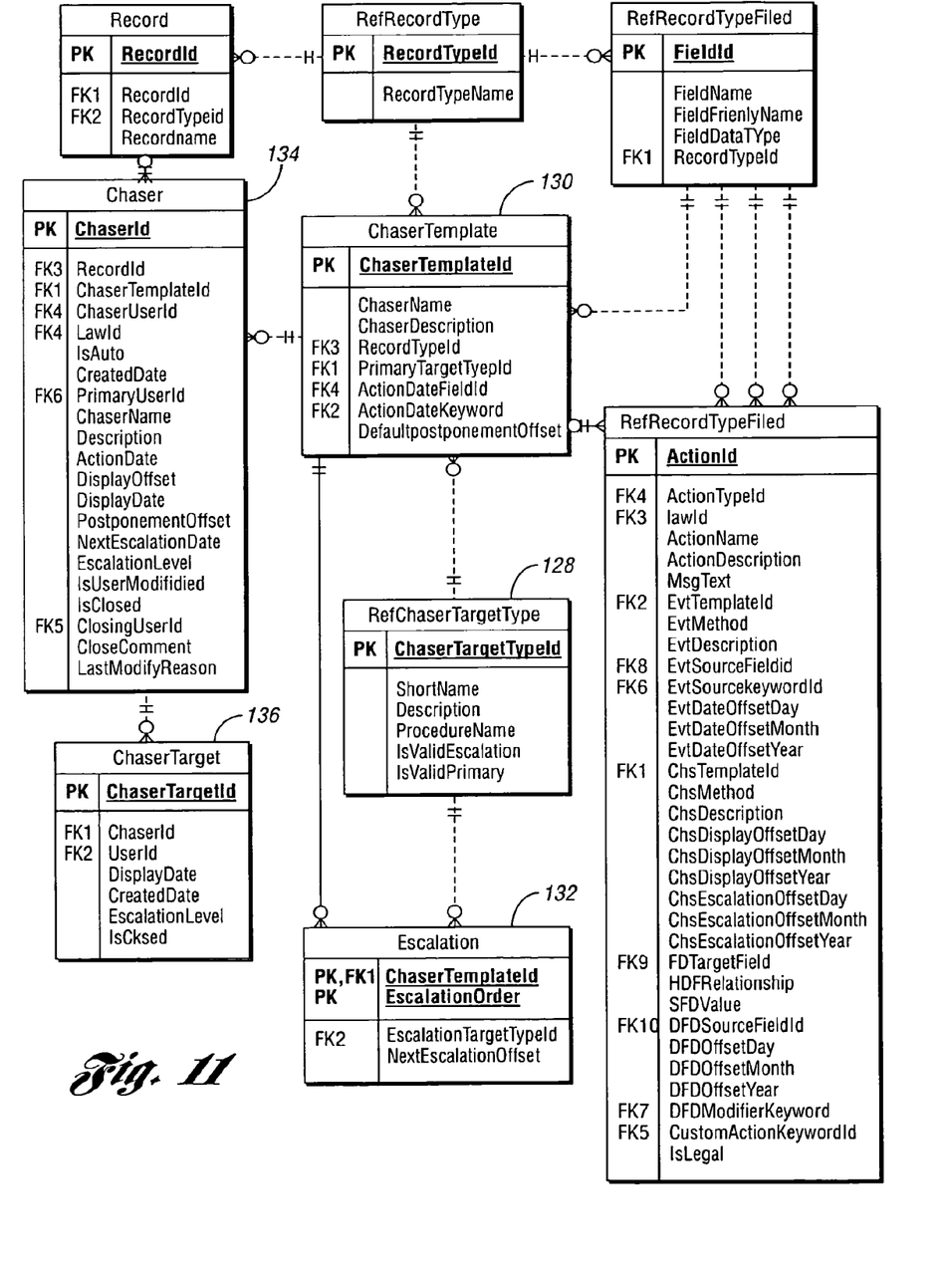
FIG. 11 is an example chaser database schema in accordance with one embodiment or aspect of the present invention.

Block 34 represents the "Retrieve Template Information" step of the "Determine Chaser Action" process. This step involves reading appropriate template information from a chaser database or other database maintaining relevant chaser information. FIG. 11 is an example chaser database schema and is described in greater detail below. Of course, the content or arrangement of the database schema illustrated in FIG. 11 may be modified or adapted to best-fit a particular implementation of the present invention.

Block 36 represents the "Calculate Action Date" step of the "Determine Chaser Action" process. The action date may be determined from the chaser template information. The template provides either the field that the action date is read from, or a keyword that can have the value 'Today'. The process will either set the ActionDate in the structure to the value of the given field, or to today's date.

For example, assume that a chaser for a renewal due is based on a last renewal date. The action date will be the last renewal, so the display offset will be +5 years, and the escalation offset +5 years and 6 months. If the chaser's action date were set on a renewal due date field, the display offset would be −1 year, and the escalation offset −6 months.

Block 38 represents the "Calculate Display Date" step of the "Determine Chaser Action" process. From the action information, the display offset is applied to the action date to arrive at the display date. If this date is in the past, a business rule may be implemented such that the display date is postponed to today and a message added to the chaser structure to inform the user that this has occurred.

Block 40 represents the "Calculate Escalation Date" step of the "Determine Chaser Action" process. The first escalation date is calculated and added to the structure—based on the escalation offset of the action. Further escalation dates are based on escalation offsets defined for the chaser template. If the escalation date is in the past, escalation may be implemented by daily scheduled task (the chaser will not be escalated immediately). In this manner, the target user has an opportunity to comply with the chaser before it is raised to higher levels. This aspect of the present invention prevents unnecessary addition of historical event data and unnecessary warnings to escalation managers.

If the escalation offset of the action is Null, the escalation date is set as Null. According to one embodiment, the law engine executes a business rule requiring that chaser templates with no escalation information cannot be escalated.

Block 42 represents the "Determine Primary User" step of the "Determine Chaser Action" process. This step involves reading information from the RefChaserTargetType table (described below) for the primary target type indicated on the chaser template. This will refer to a stored procedure that will receive the record ID and null as a chaser ID. This procedure may support the escalation process targeting as well. The procedure will return a user ID and full name that can be added to the structure.

Block 44 represents the "Determine Other Fields" step of the "Determine Chaser Action" process. The Method and Description fields are populated based on information retrieved from the action record. The chaser method describes what the action is to do to a chaser of the template type. The action can state if the chaser is to be opened, refreshed or closed.

Preferably, a postponement interval is set from a value in the chaser template. The completed chaser node is then returned to the calling process, to be added to the record structure.

Process 2—Collate Chaser Actions

Figure 4:
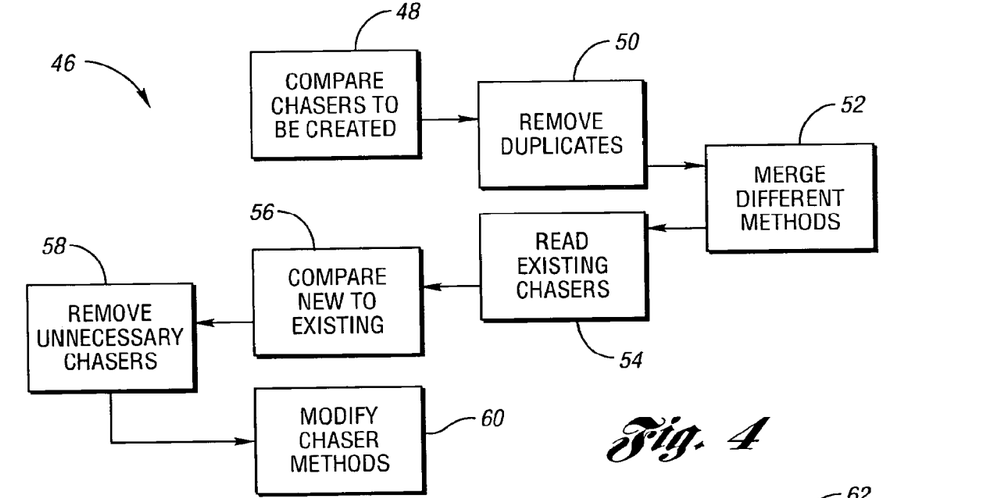
FIG. 4 is a block flow diagram illustrating a preferred methodology 46 for implementing the "Collate Chaser Action" process in accordance with one aspect or embodiment of the present invention.

FIG. 4 is a block flow diagram illustrating a preferred methodology 46 for implementing the "Collate Chaser Action" process in accordance with one aspect or embodiment of the present invention. This process involves the comparison of new and/or existing chasers to other new/existing chasers to identify any redundancies (e.g. duplicate chasers, unnecessary chasers, etc.). Redundant chasers are deleted or otherwise de-activated. Remaining chasers are implemented within the distributed legal workflow environment, as appropriate (i.e. displayed to their target user on the associated target display date. Notably, the steps, content or arrangement of FIG. 4 may be modified or adapted to best-fit a particular implementation of the present invention.

Block 48 represents the "Compare Chasers to Be Created" step of the "Collate Chaser Action" process. Block 50 represents the "Remove Duplicates" step of the "Collate Chaser Action" process. If two chaser actions are implementing the same or similar methods to the same or similar templates—such as two actions to open a renewal due chaser—one of the chasers can be removed. Preferably, the earlier node is removed to maintain the order of condition checking such that the final produced node will be correct.

Block 52 represents the "Merge Different Methods" step of the "Collate Chaser Action" process. According to one embodiment, each chaser action is defined as open, close or refresh. If two chasers refer to the same template, but are using different methods, then it may be possible to merge them or remove one. In addition, some methods can be merged to give other methods—for example "OpenClose", where a chaser is opened and closed by two different actions.

Some methods can be merged to produce other methods. For example "OpenClose", where a chaser is opened and closed by two different actions. Table 2 contains a plurality of example merged method/result combinations.

TABLE 2

| Node 1 Method | Node 2 Method | Result |
|---|---|---|
| Open | Open | Remove Node 2 |
| Open | Refresh | Remove Node 1 |
| Open | Close | Remove Node 2, set Node 1 to OpenClose method |
| Refresh | Open | Remove Node 2 |
| Refresh | Refresh | Remove Node 1 |
| Refresh | Close | Remove Node 2, Node 1 to RefreshClose |
| Close | Open | Remove Node 1, set node 2 method to CloseOpen |
| Close | Refresh | Remove Node 1, set node 2 to CloseOpen |
| Close | Close | Remove Node 2 |
| RefreshClose | Open | Remove Node 1, set node 2 to CloseOpen |
| RefreshClose | Refresh | Remove Node 1, set node 2 to CloseOpen |
| RefreshClose | Close | Remove Node 2 |
| OpenClose | Open | Remove Node 1 |
| OpenClose | Refresh | Remove Node 1 |
| OpenClose | Close | Remove Node 2 |
| CloseOpen | Open | Remove Node 2 |
| CloseOpen | Refresh | Remove Node 1, set node 2 to CloseOpen |
| CloseOpen | Close | Remove Node 1 |

Variations on results such as those set forth in Table 2 may occur if the chaser action is being carried out in conjunction with creating a record instead of a modification. For example, RefreshClose may become OpenClose. In another example, CloseThenOpen becomes Open.

At this point, the chaser action information for the record may contain only one node for any template ID. If creating a new record, the process can now return to its caller—as no comparisons with existing records are needed.

Block 54 represents the "Read Existing Chasers" step of the "Collate Chaser Action" process. The existing open chasers for the record are read so they can be compared with the new chaser action instructions.

Block 56 represents the "Compare New Chasers to Existing Chasers" step of the "Collate Chaser Action" process. This comparison is based on the content of chaser templates. Table 3 describes example actions to take based on a comparison. In accordance with this example, the Add ID note means that the ID of the existing chaser should be added to the new chaser structure to improve chaser update functionality.

TABLE 3

| New Node Method | Existing Chaser | Result |
|---|---|---|
| Open | Yes | Delete new node |
| Open | No | No change |

TABLE 3-continued

| New Node Method | Existing Chaser | Result |
|---|---|---|
| Close | Yes | No change - Add ID |
| Close | No | Delete new node |
| Refresh | Yes | No change - Add ID |
| Refresh | No | Change method to open |
| OpenClose | Yes | Change method to close - Add ID |
| OpenClose | No | No change |
| RefreshClose | Yes | No change - Add ID |
| RefreshClose | No | Change method to OpenClose |
| CloseOpen | Yes | No change - Add ID |
| CloseOpen | No | Change method to Open |

Examples of the "Remove Unnecessary New Chasers" step represented by block 58 and the "Modify Chaser Methods" step represented by block 60 are implemented in resulting actions set forth in Table 3 above.

Process 3—Implement Chaser Actions

Figure 5:
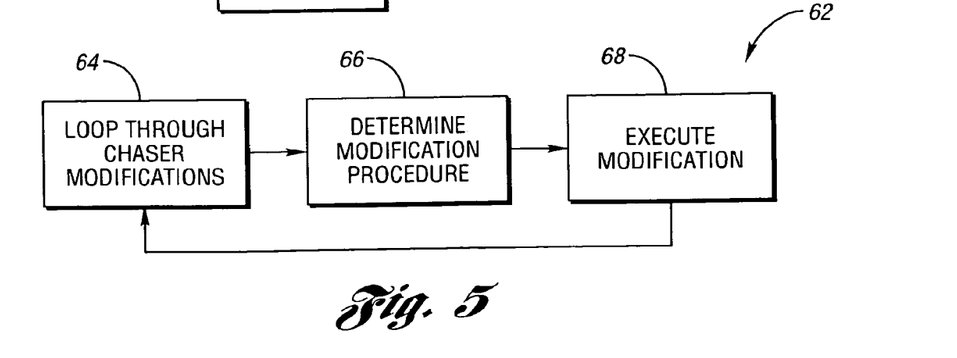
FIG. 5 is a block flow diagram illustrating a preferred methodology 62 for implementing the "Implement Chaser Action" process in accordance with one aspect or embodiment of the present invention.

FIG. 5 is a block flow diagram illustrating a preferred methodology 62 for implementing the "Implement Chaser Action" process in accordance with one aspect or embodiment of the present invention. Notably, the steps, content or arrangement of FIG. 5 may be modified or adapted to best-fit a particular implementation of the present invention.

Due to the earlier processes of comparison and collation, the implementation of the chaser actions may be simplified. In one embodiment of the present invention, each chaser action will have a single method, and where necessary will already include the ID of the chaser(s) it is modifying.

Block 64 represents the "Loop Through Chaser Modifications" step of the "Implement Chaser Action" process. In one embodiment, this step involves looping through chaser actions in the XML record structure. Aside from each chaser node's information, the chaser system detects the record ID, current user, law ID, etc. Preferably, chasers created in this manner have their respective "IsAuto" field set to true. When all chaser nodes have been processed, the process may returns to the law engine (not shown).

Block 66 represents the "Determine Modification Procedure" step of the "Implement Chaser Action" process. This step involves selecting the particular functionality for the chaser action based on the method of the chaser action.

Block 68 represents the "Execute Modification" step of the "Implement Chaser Action" process. This step involves executing the chaser action selected in Determine Modification Procedure step represented by block 66. Upon execution, the process returns to the Loop Through Chaser Modifications represented by block 64.

Process 4—Chaser Escalation

Figure 6:
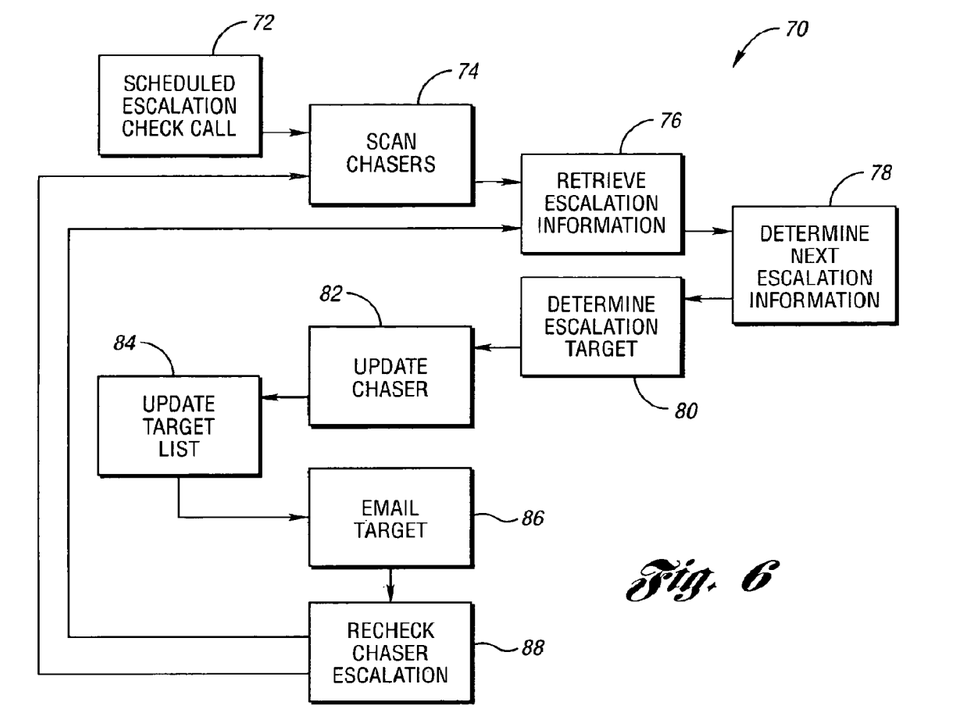
FIG. 6 is a block flow diagram illustrating a preferred methodology 70 for implementing the "Chaser Escalation" process in accordance with one aspect or embodiment of the present invention.

FIG. 6 is a block flow diagram illustrating a preferred methodology for implementing the "Chaser Escalation" process in accordance with one aspect or embodiment of the present invention. Notably, the steps, content or arrangement of FIG. 6 may be modified or adapted to best-fit a particular implementation of the present invention.

In accordance with a preferred embodiment of the present invention, the chaser escalation process is called by a scheduled task 72 on a daily basis. The system may be configured to launch multiple escalations in one schedule. Each record is preferably checked individually until it can no longer be escalated.

In one implementation of the present invention, the action opening a chaser will define how long from the action date the chaser is first escalated. The chaser template will define the intervals between levels of escalation. This aspect of the present invention provides flexibility for individual law timing and may require fewer chaser templates. For example, any information that can be included on a template rather than a law-action will simplify development and maintenance.

Block 74 represents the "Scan Chasers" step of the "Chaser Escalation" process. This step involves preparing a list of chasers that need escalation. In one implementation, this step involves selecting the chaser IDs of any open chaser with an escalation date that is not null and is dated today or earlier. The process will then loop through these chasers once, as illustrated in FIG. 6.

Block 76 represents the "Retrieve Escalation Information" step of the "Chaser Escalation" process. This step involves retrieving appropriate chaser information from the database (refer to FIG. 11). Based on the current escalation level of the chaser, the information on the next escalation level for the template is linked to the chaser. If no information is returned, the escalation cannot be done. It may be that the presence of an escalation date on the chaser was a mistake. In this case, the chaser is updated with a Null escalation level, so the chaser is not escalated again.

Block 78 represents the "Determine Next Escalation Information" step of the "Chaser Escalation" process. If escalation information was received, the next escalation date for the chaser is prepared during this step. In one implementation, the next escalation date is calculated as the current "next escalation date" plus the "next escalation offset" from the escalation information. If the "next escalation offset" is null, there is no more escalation and the "next escalation date" is set to null.

Block 80 represents the "Determine Escalation Target" step of the "Chaser Escalation" process. The escalation information includes a target type ID pointing to information in the RefChaserTargetType table, which gives a stored procedure for accepting a ChaserId and returning a UserID to be the escalation target. This step may also include checking user preferences to determine whether the user wants escalations e-mailed to him or her as well.

Block 82 represents the "Update Chaser" step of the "Chaser Escalation" process. This step involves updating the chaser record with the new Next Escalation Date and incrementing the escalation level. If the chaser display date is in the future, it is returned to today and the display offset is reset to match. Preferably, when chasers are escalated they should reappear, even if they've been postponed.

Block 84 represents the "Update Target List" step of the "Chaser Escalation" process. This step involves updating the chaser target list, adding an entry for the chaser including the target user, and copying the display date and the escalation level. If the target is already in the list, their entry is updated with the display date and escalation level.

Block 86 represents the "Email Target" step of the "Chaser Escalation" process. If the user has set a preference for escalation to be reported to them by email, a message is produced for the user and sent by e-mail.

Block 88 represents the "Recheck Escalation" step of the "Chaser Escalation" process. If the new NextEscalationDate is today or earlier, the process returns to the Retrieve Escalation Information step represented in block 76. to further escalate the chaser. This feature allows chasers to be escalated to multiple users in a single scheduled batch. If the next date is in the future or is null, the process returns to the Scan Chasers step represented by block 74, so the remaining chasers to be escalated can be handled.

Process 5—Chaser Management

Figure 7:
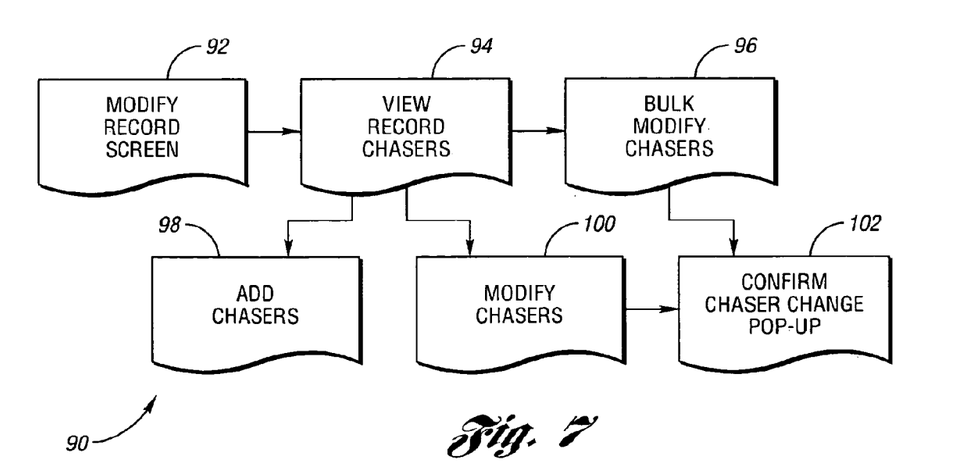
FIG. 7 is a block flow diagram illustrating a preferred GUI site map 90 for implementing the "Chaser Management" process in accordance with one aspect or embodiment of the present invention.

FIG. 7 is a block flow diagram illustrating a preferred GUI site map 90 for implementing the "Chaser Management"

process in accordance with one aspect or embodiment of the present invention. Notably, the content or arrangement of FIG. 7 may be modified or adapted to best-fit a particular implementation of the present invention.

Chaser management functionality may be provided to users in a variety of manners including an online user diary and chaser lists linked to particular workflow records. Preferably, chaser GUIs described in FIG. 7 (e.g. nos. 92-102) are opened in a new, non-modal, window. In addition, the opening page may be configured such that windows are closed if they are navigated away from.

Example Graphical User Interfaces

Figure 8:
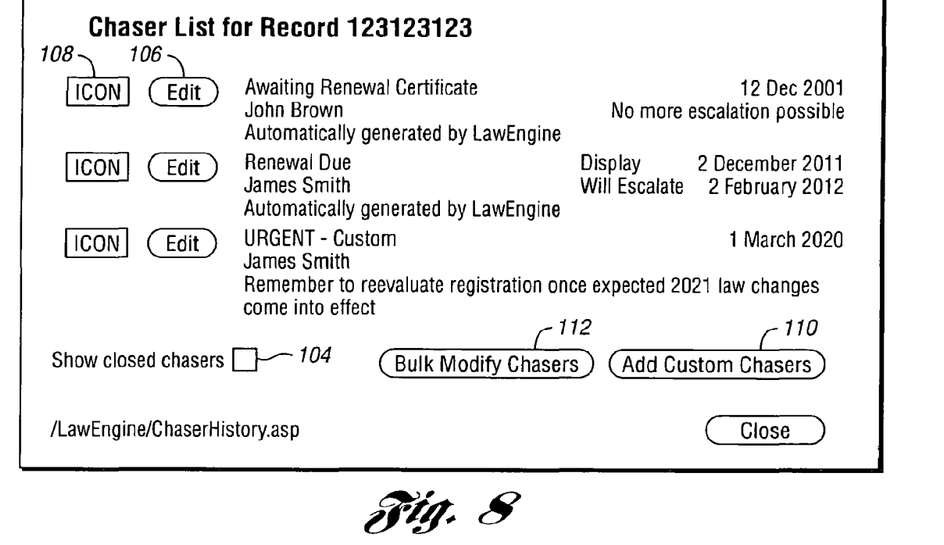
FIG. 8 is an example GUI displaying a list of chasers associated with a workflow record (i.e. Record 123123123) in accordance with one aspect or embodiment of the present invention.

FIG. 8 is an example GUI displaying a list of chasers associated with a workflow record (i.e. Record 123123123). In this embodiment, FIG. 8 displays only open chasers. Selecting the "Show Closed Chasers" checkbox 104 will refresh the page to show all chasers, including those that have been closed. Information displayed for each chaser includes the name, display date, primary target user, escalation information summary and description.

An icon 108 may be used to display the generation and severity of the chaser. Icons may express situations including but not limited to: user created, not urgent; user created, not urgent, in the past; user created, marked as urgent; law engine generated, not urgent; law engine generated, marked as urgent; and law engine generated, escalated.

Figure 9:
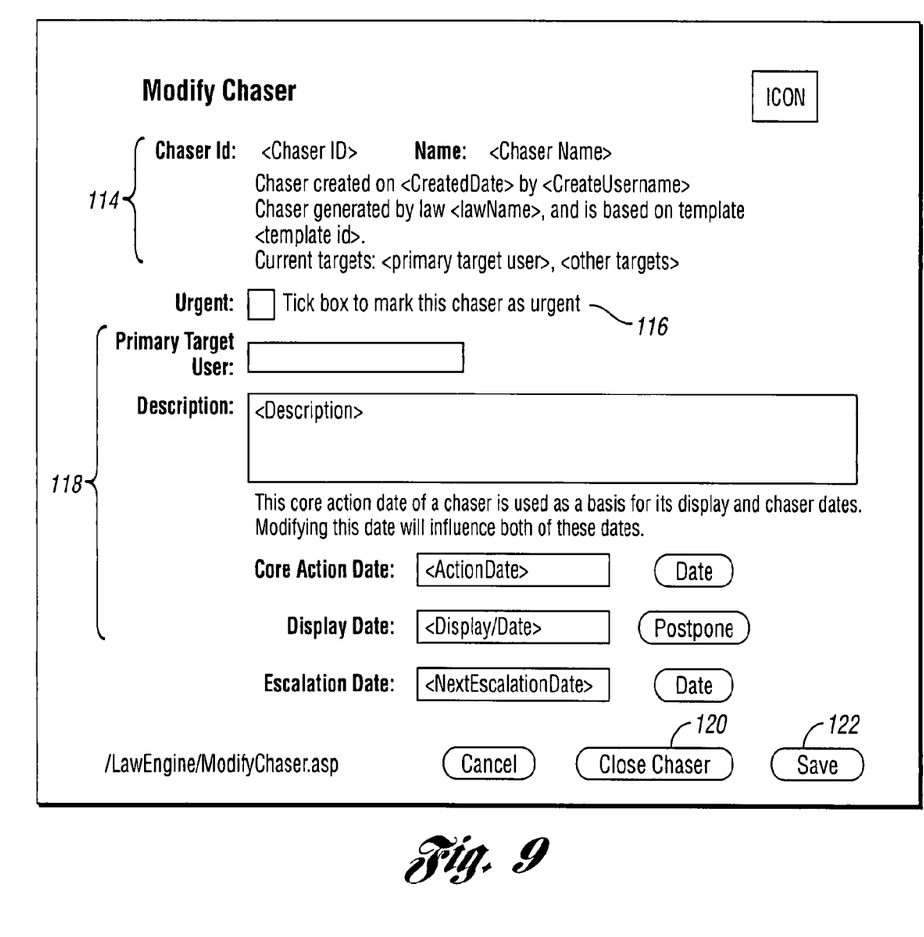
FIG. 9 is an example GUI for modifying a chaser in accordance with one aspect or embodiment of the present invention.

Selecting edit button 106 provides the user with a GUI such as that shown in FIG. 9 for modifying chaser information. Selecting button 110 provides the user with a GUI for adding a custom chaser. Selecting button 112 provides the user with a GUI such as that shown in FIG. 10 for adding a custom chaser.

FIG. 9 is an example GUI for modifying a chaser. Chaser information 114 including chaser ID, name template information, etc. may be provided. Field 116 enables a user to designate the chaser as urgent. Fields 118 enable a user to identify or modify chaser attributes including the primary target user, a description of the chaser, the core action date, the chaser display date and the chaser escalation date.

Preferably, the action of modifying the action date will prompt the user for confirmation. If this is done for an escalated chaser, a message may be sent to all chaser targets to inform them of this shift. In another preferred embodiment, a user may only modify the escalation date if the chaser has not been escalated. In addition, changing the escalation date may send a message to the first escalation target.

Postponing the display date may result in populating the date selection picklist with the current date plus the default postponement interval. The user can choose a different date, or just confirm the pre-selected date. The user may be given a warning if the new display date is after the escalation date.

If the chaser is open, a close button 120 may be shown. Selecting this button will result in closure of the chaser. Preferably, a confirmation is provided to the user prior to closure. If the chaser is already closed, this button may be replaced by a delete button—if pressed the chaser record is deleted.

The target user for the chaser can be modified. Preferably, target users are provided via drop-down or pick list. In one embodiment of the present invention, the current target and the modifying user limit the list of users by their relationship in the relevant workflow.

Selecting the save button 122 results in saving any chaser changes, preferably after user confirmation.

A GUI (not shown) for adding a custom chaser to a workflow record may include fields for inputting a display date, a primary target user, a description and an indication as to whether the chaser is urgent. Other fields may be included as well (escalation target, escalation date, etc.).

In another embodiment (not shown) a field may be provided in which a user can input a reason for the modification. Reasons may be selected from a drop-down or pick menu. For implementations susceptible to audit, inputting a reason for the modification may be required and/or approved.

Figure 10:
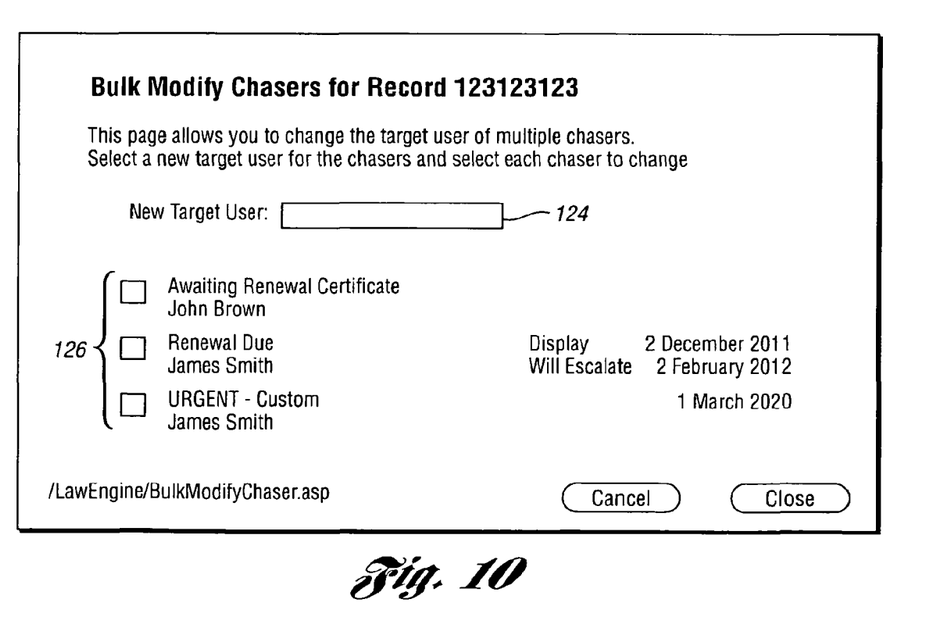
FIG. 10 is an example GUI for bulk modification of chasers in accordance with one embodiment or aspect of the present invention.

FIG. 10 is an example GUI for bulk modification of chasers. This aspect of the present invention enables a user to collect or query chasers according to a particular parameter or record, and modify them (or a portion of them) in a bulk fashion. In the example GUI shown in FIG. 10, all chasers for a particular record (i.e. Record 123123123) are displayed for target user modification 124. Selectors 126 enable a user to select which chasers corresponding to the particular record to modify in bulk.

Example Database Schema

Referring again to the example database schema illustrated in FIG. 11, certain chaser tables are described in greater detail. Of course, an unlimited number of database arrangements may be implemented to support the various aspects and embodiments of the present invention.

The "RefChaserTargetType" table 128 may be implemented to define chaser information including who a chaser should go to, or be escalated to. In addition, a user must be determined for each chaser produced from a template. One target type may be designated or identified as 'Record Case Manager'. When a chaser template is set up defining its target as 'Record Case Manager', the information in this table allows the system to look up the case manager on the record, and assign that user as the chaser's primary target. In one implementation, the basis for this lookup will be a stored procedure for each target type. The procedure may take standard parameters—(e.g. one of either recordId or chaserID) and return standard information (e.g. a UserID, the full name of the user, whether the user has a preference for escalation to be reported by email, etc.). Table 4 includes example RefChaserTargetType table fields, their corresponding information and description.

TABLE 4

| Field | Info | Description |
|---|---|---|
| ChaserTargetTypeId | int, primary key | A unique id for the target type |
| ShortName | varchar | A short display name for the type |
| Description | varchar | A longer description for the type |
| ProcedureName | varchar | The name of a procedure that is called to determine the target user |
| IsValidEscalation | bit | True if the target type can be used for escalation |
| IsValidPrimary | bit | True if the target type can be used as a primary target. |

The "Chaser Template" table 130 may be used to define the basis for a chaser produced by the law engine. According to one embodiment of the present invention, each record can only have one chaser based on each template at any time. This limitation may be used by the law engine to be able to correctly open and close chasers along with the relevant changes to a record. When the law engine triggers an action for a chaser, certain information may come from the chaser template and other information may come from the action that uses the template. The split in information may be based on what information needs to be law-specific. In one implementation, templates are defined for record types, but not laws. In this instance, template information determines the information for a chaser that will not change for specific laws. The action that changes a chaser will include the information specific to a law—such as timing information. Table 5 includes example ChaserTemplate table fields, their corresponding information and description.

TABLE 5

| Field | Info | Description |
| --- | --- | --- |
| ChaserTemplateId | int, primary key | A unique id for the template |
| ChaserName | varchar | The name for chasers using this template |
| ChaserDescription | varchar | Description of the template |
| RecordTypeId | int, foreign key | Record type this chaser can be used for, |
| PrimaryTargetTypeId | int, foreign key | Target type to send a chaser based on this template to. |
| ActionDateFieldId | int, foreign key | Field that this template uses to define a core action date |
| ActionDateKeyword | int, foreign key | Keyword to use instead of basing action date on a field. Most likely can only have value 'Today', but will allow for special cases in the future. |
| DefaultPostponementOffset | int | Default number of days to postpone a chaser of this sort by. |

The escalation path for a chaser may be defined at the template level. The "Escalation" table 132 may be implemented with a many-to-one relationship with the ChaserTemplate table 130. If a type of chaser does not have or support escalation, this table may not have any entries for that template. Otherwise, the number of entries in this table for a chaser template may indicate the number of levels of escalation possible for a chaser. Table 6 includes example Escalation table fields, their corresponding information and description.

TABLE 6

| Field | Info | Description |
| --- | --- | --- |
| ChaserTemplateId | int, primary key, foreign key | A unique id for the template |
| EscalationOrder | int, primary key | An order for the entry for this template. |
| EscalationTargetTypeId | int, foreign key | Id of a target type to determine who this escalation goes to |
| NextEscalationOffset | int | The number of days between this escalation point and the next. Will not be used on the final escalation step of a template. |

The "Chaser" table 134 contains the specific information for a single chaser. Each entry may be linked to a record. Any law-generated chaser may maintain a link to the law that raised it, and to the chaser template it was based on. Notably, a certain amount of redundancy has been left in this table. Such redundancy will allow the design to accommodate further business and/or system requirements within the scope of the present invention. Table 7 includes example Escalation table fields, their corresponding information and description.

TABLE 7

| Field | Info | Description |
| --- | --- | --- |
| ChaserId | int, primary key | A unique id for the chaser |
| RecordId | int, foreign key | The record the chaser related to |
| ChaserTemplateId | int, foreign key | The template the chaser was based on |
| CreatingUserId | int, foreign key | The user whose action caused the chaser to be raised. |
| LawId | int, foreign key | The Law that generated this chaser |
| IsAuto | bit | True if the chaser was generated by a Law |
| CreatedDate | datetime | Date the chaser entry was created |
| PrimaryUserId | int, foreign key | Primary target user for the chaser |
| ChaserName | varchar | Title for the chaser - either the template ChaserName, or 'Custom Chaser' |
| Description | varchar | Description of the subject of the chaser, set by the Law action - and editable by the user. |
| ActionDate | datetime | The core date for the chaser - at creation, escalation and display dates are set by the action relative to this. |
| DisplayOffset | int | The number of days offset between the display date and the action date |
| DisplayDate | datetime | The display date - both this and the offset being stored is an example of some redundancy that is being left for the moment. |
| PostponementOffset | int | Default interval for postponement - given either from the template, or from a system setting for custom chasers |
| NextEscalationDate | datetime | Date at which the chaser will next be escalated. |
| EscalationLevel | int | The current escalation level - will be zero for un-escalated chasers. |
| IsUserModified | bit | False initially - set to true if a user directly modifies some date information of the chaser. This user modification will then be used as a precautionary test against bulk changes of chasers due to the changing of Law timing information. |
| IsClosed | bit | True if the chaser has been closed |
| ClosingUserId | int, Foreign key | The user whose actions caused the closing of the chaser |
| CloseComment | varchar | Comment adding on closing a chaser - either entered by a |

TABLE 7-continued

| Field | Info | Description |
|---|---|---|
| LastModifedReason | varchar | user, or given by the closing action. Comment entered by a user when changing a chaser - only the last is storied, so the audit system can include the reason in its log. |

The "Chaser Target" table 136 contains the information that appears to chaser users. For example, an entry in this table linking a user to a chaser will result in that chaser appearing in that user's diary. Each chaser may have one or more targets—the first entry might always be the chaser's primary target user. Subsequent target entries may include the escalation targets for the chaser. Notably, some repetition of chaser information has taken place on this table. This allows the chaser target table to be used efficiently for listing the chasers involved in a user's diary.

The display date may be stored against each chaser target. Preferably, it is always set from the chaser record. In addition, the IsClosed tag from the chaser may be copied to the target so that closed chasers can be filtered.

While the best mode for carrying out the invention has been described in detail, those familiar with the art to which this invention relates will recognize various alternative designs and embodiments for practicing the invention as defined by the following claims.

What is claimed:

1. A computer system for chaser management in a distributed legal workflow environment, the computer system providing central administration of legal workflow conducted by a plurality of distributed participants and comprising a computer network including one or more computers operably programmed and configured to
   (i) generate a plurality of workflow chasers associated with a plurality of workflow records, wherein each of the chasers includes at least a record, action, target user and display date attribute, and one or more of the chasers include an escalation date and an escalation manager attribute;
   (ii) compare attributes of the chasers to identify at least one redundant chaser;
   (iii) remove the at least one redundant chaser leaving remaining chasers; and
   (iv) implement the remaining chasers in the distributed legal workflow environment by displaying at least one of the remaining chasers to an escalation manager on the escalation date, wherein at least some of the chasers are modified during a single modification transaction.

2. The computer system of claim 1 wherein the removal of the at least one redundant chaser includes the removal of a duplicate chaser.

3. The computer system of claim 1 wherein the removal of the at least one redundant chaser includes merging one or more attributes of two or more of the chasers.

4. The computer system of claim 1 wherein the removal of the at least one redundant chaser includes removal of one or more unnecessary new chasers.

5. The computer system of claim 1 wherein new chasers are compared.

6. The computer system of claim 1 wherein existing chasers are compared.

7. The computer system of claim 1 wherein new chasers are compared to existing chasers.

8. The computer system of claim 1 wherein the remaining chasers are further implemented by displaying at least one of the remaining chasers to the target user on a display date.

9. The computer system of claim 1 wherein the escalation date is calculated automatically.

10. The computer system of claim 1 wherein the one or more computers are additionally operably programmed and configured to receive input modifying one or more chaser attributes.

11. The computer system of claim 1 wherein the one or more computers are additionally operably programmed and configured to create one or more chasers automatically based on one or more encoded laws or business rules.

12. The computer system of claim 1 wherein the one or more computers are additionally operably programmed and configured to receive input creating one or more custom user-defined chasers.

13. A computer-implemented method for chaser management in a distributed legal workflow environment providing central administration of legal workflow conducted by a plurality of distributed participants, the method comprising:
   by one or more computers,
      (i) generating a plurality of workflow chasers associated with a plurality of workflow records, wherein each of the chasers includes at least a record, action, target user and display date attribute, and one or more of the chasers include an escalation date and an escalation manager attribute,
      (ii) comparing attributes of the chasers to identify at least one redundant chaser,
      (iii) removing the at least one redundant chaser leaving remaining chasers, and
      (iv) implementing the remaining chasers in the distributed legal workflow environment by displaying at least one of the remaining chasers to an escalation manager on the escalation date, wherein at least some of the chasers are modified during a single modification transaction.

14. The method of claim 13 wherein the step of removing the at least one redundant chaser includes removing a duplicate chaser.

15. The method of claim 13 wherein the step of removing the at least one redundant chaser includes merging one or more attributes of two or more of the chasers.

16. The method of claim 13 wherein the step of removing the at least one redundant chaser includes removing one or more unnecessary new chasers.

17. The method of claim 13 wherein new chasers are compared.

* * * * *